US009431785B2

(12) United States Patent
Song et al.

(10) Patent No.: US 9,431,785 B2
(45) Date of Patent: Aug. 30, 2016

(54) HIGH POWER ULTRA-SHORT LASER DEVICE

(71) Applicants: Electronics and Telecommunications Research Institute, Daejeon (KR); GWANGJU INSTITUTE OF SCIENCE AND TECHNOLOGY, Gwangju (KR)

(72) Inventors: Dong Hoon Song, Daejeon (KR); Do Kyeong Ko, Gwangju (KR); Dong Ho Shin, Daejeon (KR); Hwang Woon Lee, Daejeon (KR); Moon Youn Jung, Daejeon (KR); Won Bae Cho, Daejeon (KR)

(73) Assignees: Electronics and Telecommunications Research Institute, Daejeon (KR); GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 88 days.

(21) Appl. No.: 14/264,307

(22) Filed: Apr. 29, 2014

(65) Prior Publication Data

US 2015/0288126 A1 Oct. 8, 2015

(30) Foreign Application Priority Data

Jan. 23, 2014 (KR) .................. 10-2014-0008151

(51) Int. Cl.
*H01S 3/08* (2006.01)
*G02B 5/09* (2006.01)
(Continued)

(52) U.S. Cl.
CPC ............ *H01S 3/005* (2013.01); *H01S 3/0813* (2013.01); *H01S 3/0823* (2013.01);
(Continued)

(58) Field of Classification Search
CPC ......... G02B 17/004; G02B 5/09; H01S 3/05; H01S 3/0813; H01S 3/08068
See application file for complete search history.

(56) References Cited

U.S. PATENT DOCUMENTS 5,327,449 A * 7/1994 Du ..................... H01S 3/08081
372/108
5,392,309 A * 2/1995 Nishimae ............ H01S 3/08081
372/103

(Continued)

FOREIGN PATENT DOCUMENTS

| JP | 6152015 A | | 5/1994 |
|----|-----------|---|--------|
| KR | 2012106282 A | * | 3/2011 |
| KR | 1020110023385 A | | 3/2011 |
| KR | 1020120106282 A | | 9/2012 |

OTHER PUBLICATIONS

D.H. Song et al., "A compact Kerr-lens mode-locked Ti:sapphire oscillator with 330 nJ soliton-like pulses," Laser Physics Letters, Apr. 30, 2013, pp. 1-5, 10, 065003, IOP Publishing.

*Primary Examiner* — Eric Bolda
(74) *Attorney, Agent, or Firm* — William Park & Associates Ltd.

(57) ABSTRACT

Disclosed is a high power ultra-short pulsed laser device increasing pulse energy by using resonators. A pulsed laser device may comprise a first resonator making a pump beam resonate primarily and passing the pump beam which resonated through a first output mirror; and a second resonator comprising a first multiple reflection mirror and a second multiple reflection mirror. Also, the first multiple reflection mirror includes at least one first small area mirror, and the second multiple reflection mirror includes at least one second small area mirror, and the second resonator makes the laser beam delivered from the first resonator resonate by reflecting the laser beam repetitively. Therefore, the pulsed laser device may increase pulse energy without using a multi-stage amplifier so that a high power ultra-short pulsed laser beam can be generated.

10 Claims, 8 Drawing Sheets (51) Int. Cl.
*G02B 17/00* (2006.01)
*H01S 3/00* (2006.01)
*H01S 3/102* (2006.01)
*H01S 3/11* (2006.01)
*H01S 3/082* (2006.01)
*H01S 3/07* (2006.01)
*H01S 3/081* (2006.01)
*H01S 3/094* (2006.01)
*H01S 3/16* (2006.01)

(52) U.S. Cl.
CPC ........ *H01S 3/08068* (2013.01); *H01S 3/1024* (2013.01); *H01S 3/11* (2013.01); *H01S 3/1112* (2013.01); *G02B 5/09* (2013.01); *G02B 17/004* (2013.01); *H01S 3/07* (2013.01); *H01S 3/0811* (2013.01); *H01S 3/094038* (2013.01); *H01S 3/1625* (2013.01); *H01S 3/1636* (2013.01); *H01S 2301/02* (2013.01)

(56) References Cited

U.S. PATENT DOCUMENTS

| | | | |
|---|---|---|---|
| 5,604,643 A * | 2/1997 | Yamamoto | G01N 21/031 359/365 |
| 6,166,375 A * | 12/2000 | Ahten | G06K 7/10702 235/454 |
| 6,305,809 B1 * | 10/2001 | Zadro | A45D 42/08 248/474 |
| 2003/0161373 A1 * | 8/2003 | Kitatochi | G03F 7/70025 372/55 |
| 2005/0041718 A1 * | 2/2005 | Eisenbarth | H01S 3/0604 372/94 |
| 2006/0193362 A1 * | 8/2006 | Kopf | H01S 3/063 372/93 |
| 2012/0092782 A1 * | 4/2012 | So | G02B 17/004 359/858 |

* cited by examiner

HIGH POWER ULTRA-SHORT LASER DEVICE

CLAIM FOR PRIORITY

This application claims priorities to Korean Patent Application No. 10-2014-0008151 filed on Jan. 23, 2014 in the Korean Intellectual Property Office (KIPO), the entire contents of which are hereby incorporated by references.

BACKGROUND

1. Technical Field

Example embodiments of the present invention relate to a pulsed laser device, and more specifically to a high power ultra-short pulsed laser device which increases pulsed energy by using a resonator.

2. Related Art

After a laser was invented in 1960s, studies on application of the laser to industrial domain started from 1970s. From 1980s, the laser (especially, $CO_2$ laser) has been applied to various application domains such as an industrial field, a medical field, a communication field, a display field, etc.

Also, a solid state laser appeared in 1980 due to development of a diode laser. Since the solid state laser can be applied to domains which a conventional gas laser cannot be used easily for, and demand for the laser has been increased. Accordingly, the laser is being applied to wide-range domains including an industrial domain such as a laser work, a laser cutting, a laser welding, a laser punching, a trimming, an etching, etc., a medical domain such as a dental treatment, removal of skin spot and tattoo, removal of hair, LASIK operation, etc., a study on interaction between laser and materials, a national defense technology domain, and a culture domain.

As industrial technology advances, high degree of precision and high productivity of the laser has been required. In order to meet the requirements, recently, femtosecond laser is being utilized widely for various domains.

The femtosecond laser has a property that light energy is converged during a very short time ($10^{-15}$ of a second), and light is emitted. Accordingly, the femtosecond laser has different characteristics from conventional lasers. For example, since the femtosecond laser is illuminated on a medium during a time shorter than a time required for transferring heat to the medium when the laser is illuminated on the medium, an effect of heat or a thermal strain generated due to conventional laser operations may be prevented.

Also, since it is possible that the femtosecond laser fabricates a medium without damaging a surface of the medium, the femtosecond laser has been used for domains (such as semiconductors, electronic chips, medicine, etc.) requiring precise and fine processes.

However, in order to achieve an increased yield rate, a wider fabrication surface, etc., the femtosecond laser has a limit of output power for industrial purpose when it is used unilaterally. Therefore, it can be a restriction for enlarging its application domains.

SUMMARY

Accordingly, example embodiments of the present invention are provided to substantially obviate one or more problems due to limitations and disadvantages of the related art.

Example embodiments of the present invention provide a pulsed laser device which increases pulse energy without using a multi-stage amplifier.

Example embodiments of the present invention also provide a pulsed laser device which simplifies a laser beam path, makes an optical alignment easy, and minimizes a thermal lensing effect.

In some example embodiments, a high-power ultra-short pulsed laser device may comprise a first resonator making a pump beam resonate primarily and passing the pump beam which resonated through a first output mirror; and a second resonator comprising a first multiple reflection mirror and a second multiple reflection mirror, wherein the first multiple reflection mirror includes at least one first small area mirror positioned in the first multiple reflection mirror, and the second multiple reflection mirror includes at least one second small area mirror positioned in the second multiple reflection mirror, and the second resonator makes a laser beam delivered from the first resonator resonate by reflecting the laser beam repetitively.

Here, at least one first through-hole may be formed in the first multiple reflection mirror, and at least one second through-hole may be formed in the second multiple reflection mirror. Also, the at least one first small area mirror may be positioned in the at least one first through-hole, and the at least one second small area mirror may be positioned in the at least one second through-hole.

Here, the first resonator may comprise a focusing lens focusing the pump beam, a first gain medium through which the pump beam focused by the focusing lens passes, a first curved surface mirror, a first reflection mirror, a second reflection mirror, a second curved surface mirror, and a third reflection mirror which make the laser beam which passed through the first gain medium be reflected or retroreflected sequentially.

Here, the device may further comprise a pump laser generating the pump beam.

Here, the laser beam which is made resonate primarily by the first resonator may be reflected on a fourth reflection mirror, and delivered to one of the at least one second small mirror, and reflected repetitively between the first multiple reflection mirror and the second multiple reflection mirror.

Here, the first multiple reflection mirror and the at least one first small area mirror may be plane reflection mirrors, and the second multiple reflection mirror and the at least one second small area mirror may be curved surface reflection mirrors.

Here, the laser beam which is reflected finally on the second multiple reflection mirror may pass through one of the at least one first through-hole and may be delivered to a second output mirror. In this case, the device may further comprise a second gain medium through which the laser beam which passed through the second output mirror passes, a third curved surface mirror, a fourth curved surface mirror, and a fifth curved surface mirror which reflect or retroreflect the laser beam which passed through the second gain medium sequentially.

Also, the device may further comprise additional resonator which makes the laser beam which passed through the second output mirror resonate by reflecting the laser beam repetitively, wherein the additional resonator has a same configuration with the second resonator.

Here, the at least one first through-hole and the at least one second through-hole may have shapes of U or V.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
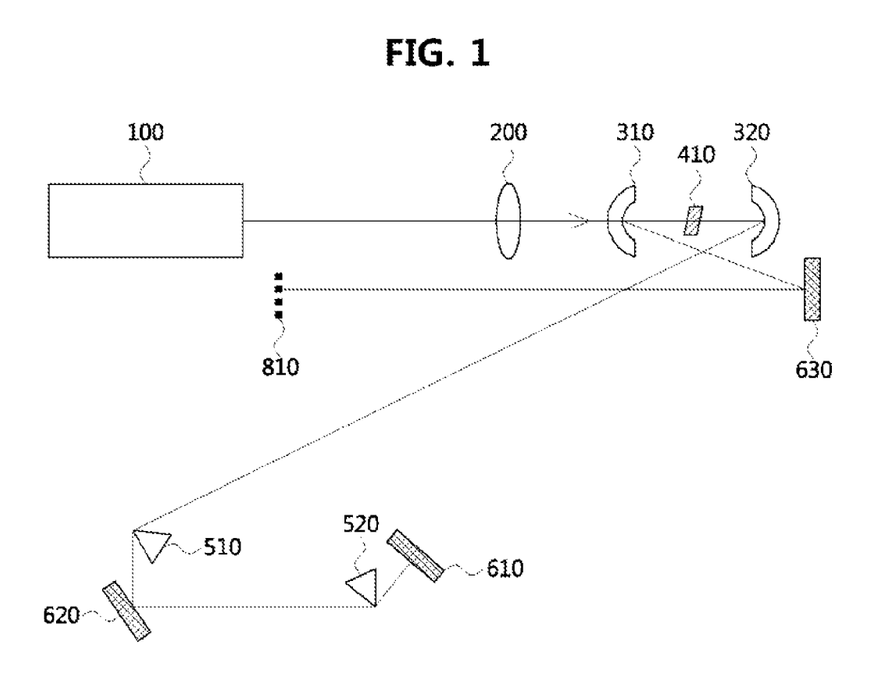
FIG. 1 is a view explaining a first resonator constituting a pulsed laser device according to an example embodiment of the present invention.

FIG. 1 is a view explaining a first resonator constituting a pulsed laser device according to an example embodiment of the present invention.

In FIG. 1, a pump laser 100 and a first resonator constituting a pulsed laser device according to an example embodiment of the present invention are shown. A pump beam generated in the pump laser 100 may be made resonate primarily by the first resonator.

The first resonator may comprise a focusing lens 200, a first gain medium 410, a first curved surface mirror 310, a first reflection mirror 610, a second reflection mirror 620, a second curved surface mirror 320, and a third reflection mirror 630.

The pump beam generated in the pump laser 100 may pass through the first gain medium 410 via the focusing lens 200, and the laser beam which passed through the first gain medium 410 may be reflected on the second curved surface mirror 320 and reflected again on the second curved surface mirror 320 after passing a first prism 510, the second reflection mirror 620, a second prism 520, and the first reflection mirror 610. The laser beam delivered to the second curved surface mirror 320 may be reflected on the first curved surface mirror 310, reflected on the third reflection mirror 630, and outputted to a first output mirror 810.

Therefore, the first resonator may be configured to comprise the focusing lens 200 focusing the pump beam, the first gain medium 410 through which the focused pump beam passes, the first curved surface mirror 310, the first reflection mirror 610, the second reflection mirror 620, the second curved surface mirror 320, and the third reflection mirror 630 which reflect or retroreflect the laser beam passing through the first gain medium 410 sequentially.

Specifically, the pump laser 100 may be configured with one of a frequency doubled Nd:YAG laser device, a Nd:YVO4 laser device, a diode laser, etc. The pump beam generated in the pump laser 100 may be focused by the focusing lens 200 and delivered to the first gain medium 410.

The first resonator, as a resonator for generating laser, may comprise the first gain medium 410, the first curved surface mirror 310, the second curved surface mirror 320, the first to third reflection mirrors 610, 620, and 630, the first prism 510, and the second prism. The first curved surface mirror 310 and the second curved surface mirror 320 may have dichroism.

The first gain medium 410 may be configured with titanium-saphire (Ti:Saphire), and the pump beam may excite electrons in the first gain medium 410. The laser beam which passed through the first gain medium 410 may be reflected on the second curved surface mirror 320 and delivered to the first reflection mirror 610 via the second reflection mirror 620. The laser beam retroreflected on the first curved surface mirror 610 may be delivered to the second curved surface mirror 320 via the second reflection mirror 620, and delivered to the first curved surface mirror 310 after passing through the first gain medium 410.

After being reflected again on the first curved surface mirror 310, the laser beam may be delivered to the third reflection mirror 630. The first output mirror 810 may be located in the path that the laser beam reflected on the first curved surface mirror 310 is reflected again on the third reflection mirror 630.

Here, in order for the first prism 510 and the second prism 520 to compensate positive dispersion caused by the first gain medium 410 and atmosphere, the first prism 510 and the second prism 520 may give negative dispersion. It is preferred that materials having high refractive index are used for the first prism 510 and the second prism 520. For example, SF11 materials may be used for the prisms. This is for keeping, by a high degree of dispersion value, a balance of pulse stability and self-phase modulation which may occur as an output power in the resonator increases.

Also, if such the compensation condition is satisfied, when fluctuation is given to one of the prisms or the mirrors from the external, eigenmode in the resonator may temporarily change greatly, and a third-order nonlinear optical Kerr effect may be generated. Due to the effect, self-phase modulation, self-amplitude modulation, negative dispersion, etc. may affect each other, and so phases of modes in the resonator may coincide so that a mode-locking occurs. This is referred to as a 'Kerr-lens-mode-locking'. For example, it is possible that the first prism 510 and the second prism 520 are substituted with chirped mirrors.

A laser pulse according to the present invention may be a femtosecond laser pulse. Specifically, since a laser beam has intenser center region than boundary regions, when a laser beam passes through a gain medium, a passing time of the laser beam in the center region is longer than that in the boundary regions so that the gain medium may act as a role similar to that of a convex lens.

In this case, the intenser region of the laser beam may be focused more strongly than other regions of the laser beam. If a diaphragm is prepared to cover weak boundary regions of the laser beam, only the center region of the laser beam with high intensity may achieve gain in the resonator. Accordingly, a femtosecond pulse may be generated. The above-described manner is referred to as a 'hard aperture mode locking'.

Meanwhile, the role of the diaphragm may be performed by a laser beam of the pump laser 100. In this case, the above-described manner is referred to as a 'soft aperture mode locking'.

The above-described Kerr lens mode locking has advantages of generating a pulse train more stably since it can obtain a large non-linear modulation depth as compared with performing mode-locking by using a passive saturable absorber, for example, a saturable Bragg reflector mirror.

Figure 2:
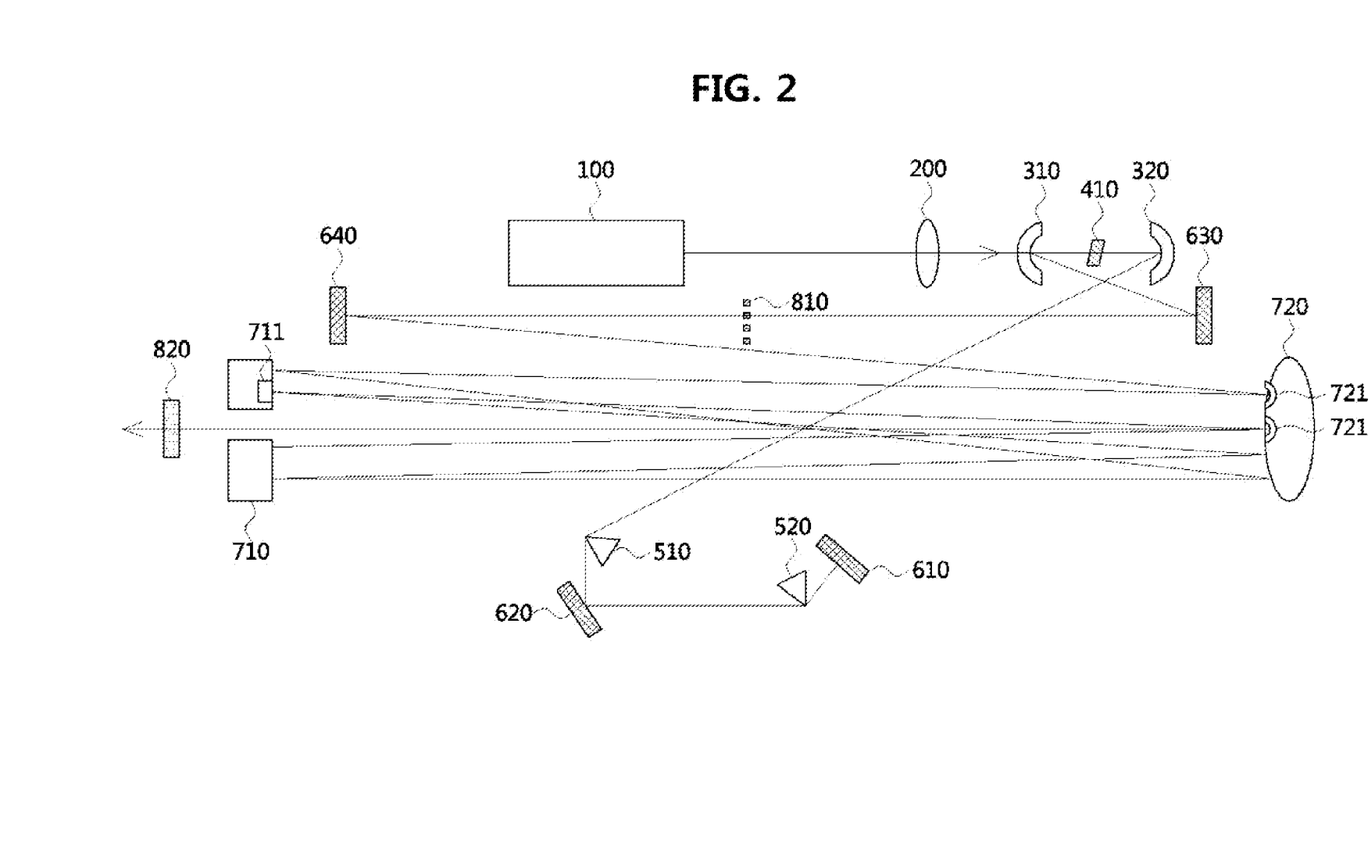
FIG. 2 is a view explaining a pulsed laser device according to an example embodiment of the present invention.

FIG. 2 is a view explaining a pulsed laser device according to an example embodiment of the present invention.

Referring to FIG. 2, a pulsed laser device according to an example embodiment of the present invention may make a laser beam transferred from a first resonator resonate by reflecting the laser beam repetitively through a second resonator.

The second resonator may comprise a first multiple reflection mirror 710, a second multiple reflection mirror 720. Also, at least one first small area mirror 711 may be positioned in the multiple reflection mirror 710, and at least one second small area mirror 720 may be positioned in the multiple reflection mirror 721. The second resonator may make a laser beam delivered from the first resonator resonate by reflecting the laser beam repetitively.

Here, a case, in which a through-hole is formed in each of the first multiple reflection mirror 710 and the second multiple reflection mirror 720, is illustrated in FIG. 2. However, the present invention is not limited to a case in which only one through-hole is formed in each of the mirrors.

Specifically, the second resonator may comprise the first multiple reflection mirror 710 in which at least one first through-hole is formed, the second multiple reflection mirror 720 in which at least one second through-hole is formed, at least one first small area mirror 711 positioned in the at least one first through-hole, and at least one second small area mirror 721 positioned in the at least one second through-hole. Also, the second resonator may make the laser beam delivered from the first resonator resonate by reflecting the laser beam repetitively.

The laser beam which the first resonator made resonate primarily may be reflected in a fourth reflection mirror 640, delivered to one of the at least one second small area mirror 721 and reflected repetitively between the first multiple reflection mirror 710 and the second multiple reflection mirror 720.

More specifically, the second resonator constituting the pulsed laser device according to an example embodiment of the present invention may comprise the fourth reflection mirror 640, the first multiple reflection mirror 710, the second multiple reflection mirror 720, at least one small area mirror 711 and 721 which may change a path of the laser beam during multiple reflections. Also, the second resonator may comprise a second output mirror 820.

Meanwhile, a notch or a through-hole having a shape of U or V may be formed in the first multiple reflection mirror 710 and the second multiple reflection mirror 720. Also, a direction of the laser beam passing through the through-hole may be changed by using the small area mirrors 711 and 721, and may be reflected repetitively so that the second resonator can be made compact. Here, the first small area mirror 711 may be positioned in the first through-hole formed in the first multiple reflection mirror 710, and the second small area mirror 721 may be positioned in the second through-hole formed in the second multiple reflection mirror 720.

The laser beam outputted from the first resonator may be entered into the second resonator via the fourth reflection mirror 640 and the second small area mirror 721. Also, the laser beam may arrive at the first small area mirror 711 after repetitive reflections occurred clockwise or counterclockwise. Also, after the laser beam passed the second small area mirror 721, multi-path reflection may occur again clockwise or counterclockwise.

As a result, the laser beam reflected finally in the second multiple reflection mirror 720 may pass through one of the at least one first through-hole and then delivered to the second output mirror 820.

Figure 3:
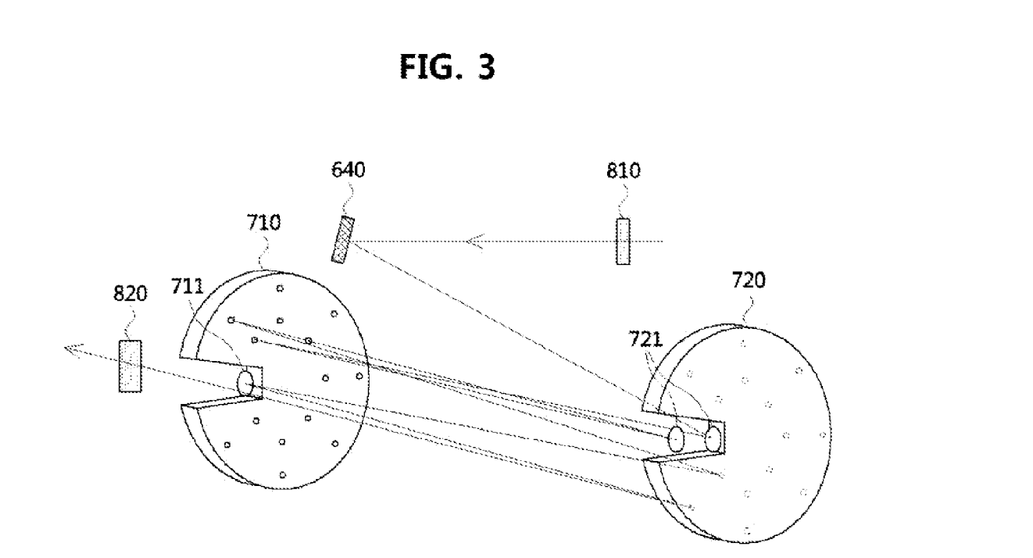
FIG. 3 is a view to explain a multiple reflection mirror of a pulsed laser device according to an example embodiment of the present invention in more detail.

FIG. 3 is a view to explain a multiple reflection mirror of a pulsed laser device according to an example embodiment of the present invention in more detail.

Referring to FIG. 3, a path of a laser beam in multiple reflections and repetitive reflections may be explained in more detail as the following descriptions.

The second resonator may start its operation essentially in the first output mirror 810 of the first resonator.

For example, in a state preserving a q-parameter (a physical value involving radius of curvature of a laser beam and a size of a laser beam) in a position of a laser beam which arrives finally at the second output mirror 820 by using the first multiple reflection mirror 710 and the first small area mirror 711 having flat planes and the second multiple reflection mirror 720 and the second small area mirror 721 having curved surface, an ABCD matrix can be calculated. Through the calculation, a distance between the first multiple reflection mirror 710 and the second multiple reflection mirror 720 may be set to 1.025m, and an angle between two points which the laser beam hits continuously may be set to 45 degrees.

In a case that a distance between the first multiple reflection mirror 710 and the second output mirror 820 is remarkably smaller than a distance between the second multiple reflection mirror 320 and the first reflection mirror 610, the Kerr lens mode locking condition of the first resonator does not change so that a high power pulsed laser can be generated.

Finally, after an optical alignment on the second resonator is completed, the first output mirror 810 of the first resonator may be removed.

Figure 4:
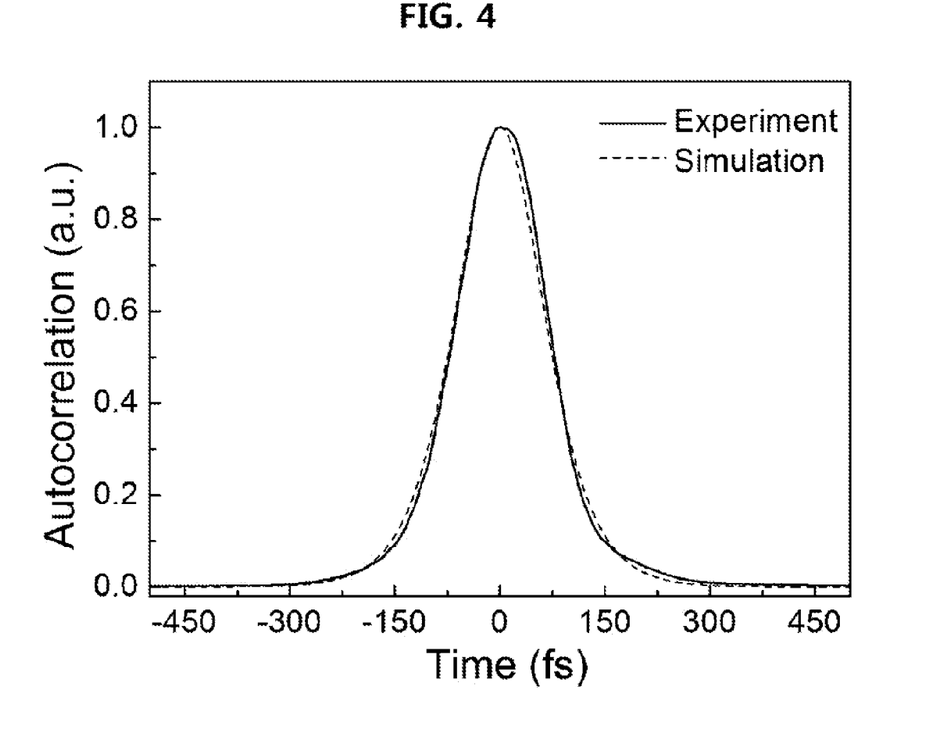
FIG. 4 is a graph illustrating a shape of a pulse obtained from a pulsed laser device according to an example embodiment of the present invention.
Figure 5:
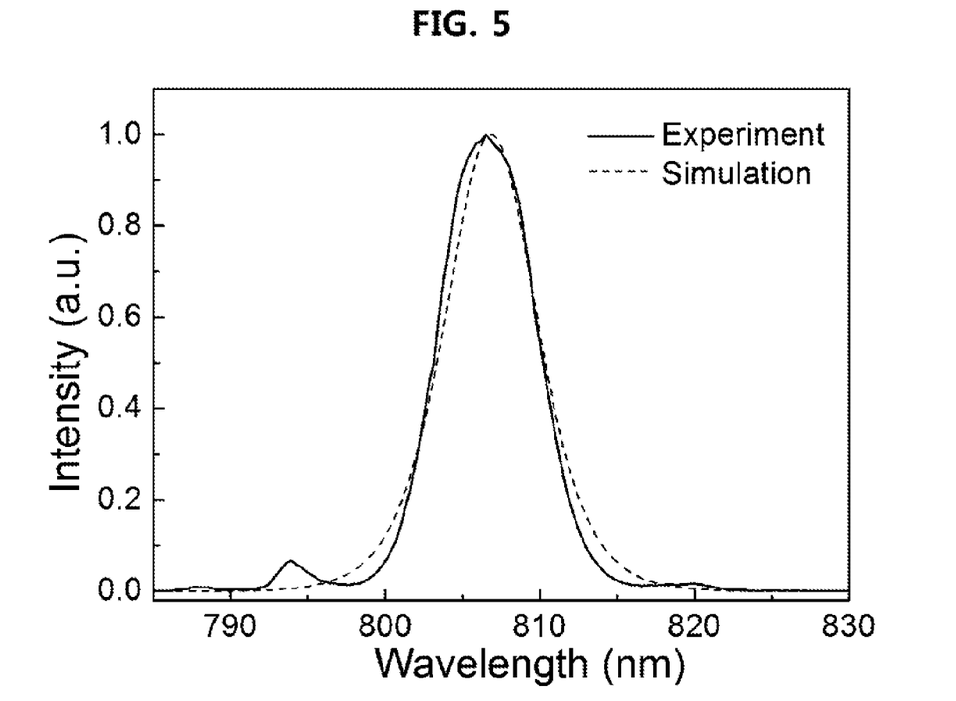
FIG. 5 is a graph illustrating a laser spectrum obtained from a pulsed laser device according to an example embodiment of the present invention.
Figure 6:
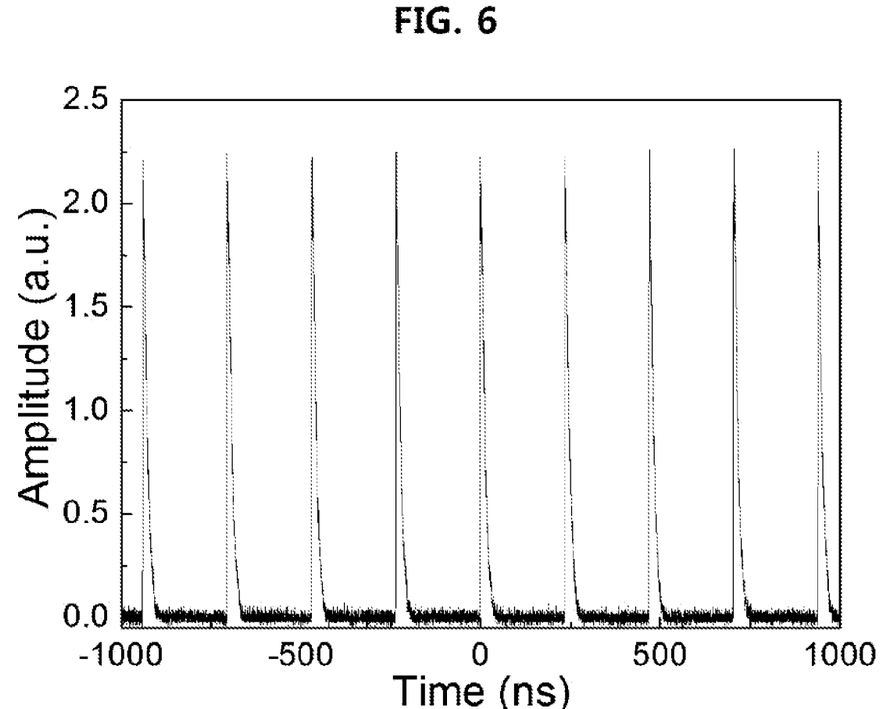
FIG. 6 is a graph illustrating a laser pulse train obtained from a pulsed laser device according to an example embodiment of the present invention.
Figure 7:
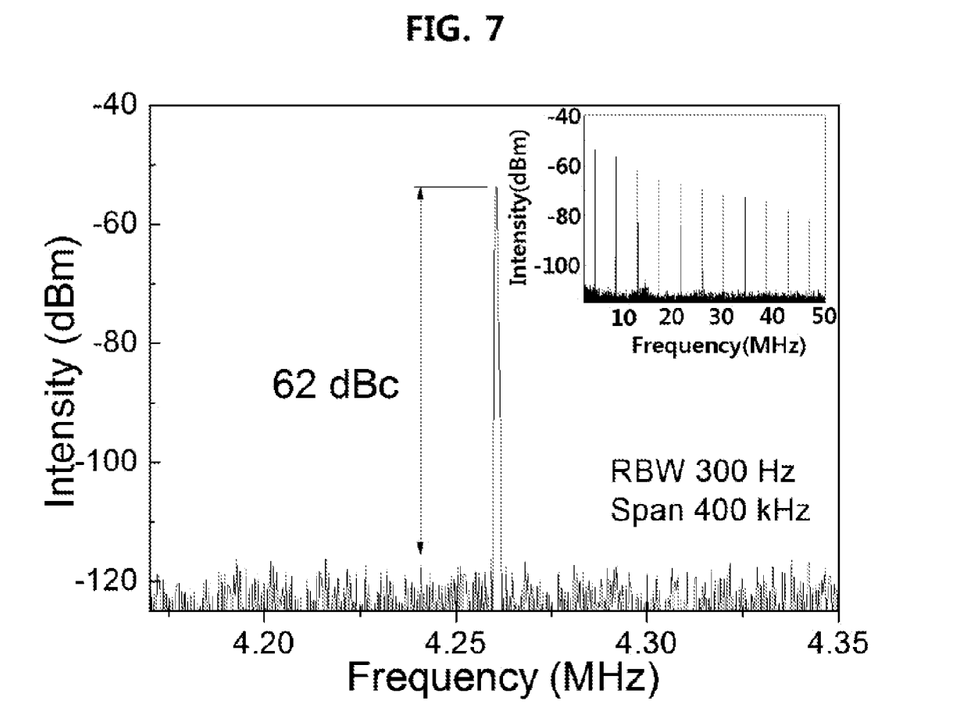
FIG. 7 is a graph illustrating a signal-to-noise ratio obtained from a pulsed laser device according to an example embodiment of the present invention.

FIG. 4 is a graph illustrating a shape of a pulse obtained from a pulsed laser device according to an example embodiment of the present invention, and FIG. 5 is a graph illustrating a laser spectrum obtained from a pulsed laser device according to an example embodiment of the present invention, and FIG. 6 is a graph illustrating a laser pulse train obtained from a pulsed laser device according to an example embodiment of the present invention, and FIG. 7 is a graph illustrating a signal-to-noise ratio obtained from a pulsed laser device according to an example embodiment of the present invention.

Referring to FIG. 4, a shape of a pulse obtained from the pulsed laser device depicted in FIG. 2 is illustrated. The repetition rate is 4.26 MHz, and a distance between the pulses is 235 ns (nanoseconds). In FIG. 4, it is shown that a pulse of 98 femtoseconds is finally generated when measured by a method using an interference-type autocorrelator.

FIG. 5 illustrates a spectrum obtained from a long-period high-power ultra-short pulsed laser device according to FIG. 2. Referring to FIG. 5, a half-width represents 7 nm.

FIG. 6 illustrates a pulse train obtained from a long-period high-power ultra-short pulsed laser device according to FIG. 2.

FIG. 7 illustrates a signal-to-noise ratio obtained from a long-period high-power ultra-short pulsed laser device according to the present invention. Referring to FIG. 7, it is proved that a pulse is generated stably with a signal to noise ratio over 60 dB.

Figure 8:
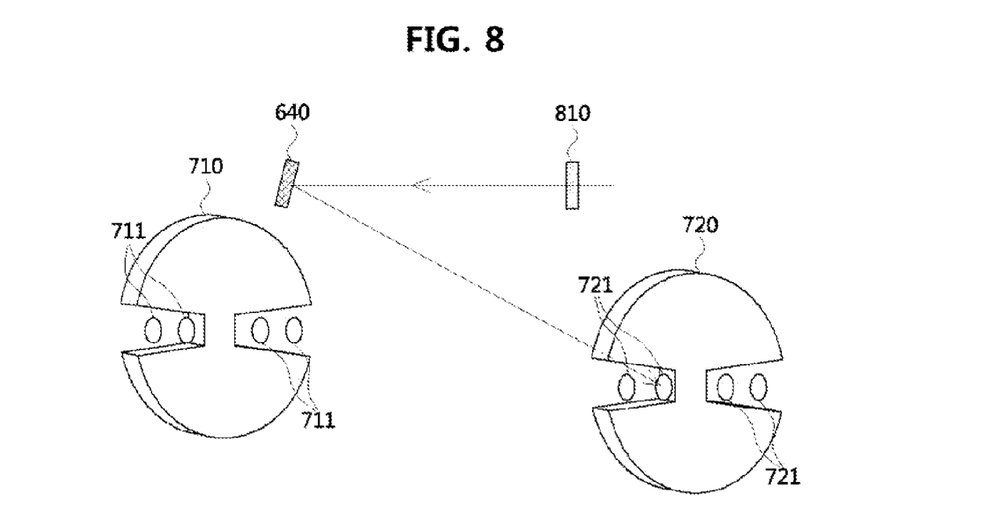
FIG. 8 is an exemplary view explaining a multiple reflection mirror of a pulsed laser device according to another example embodiment of the present invention.

FIG. 8 is an exemplary view explaining a multiple reflection mirror of a pulsed laser device according to another example embodiment of the present invention.

Referring to FIG. 8, it is shown that two through-holes are formed in each of the first multiple reflection mirror 710 and the second multiple reflection mirror 720 included in the second resonator. That is, at least one through-hole may be formed in each of the first multiple reflection mirror 710 and the second multiple reflection mirror 720, and at least one small area mirror 711 and 721 may be positioned in each through-hole.

Figure 9:
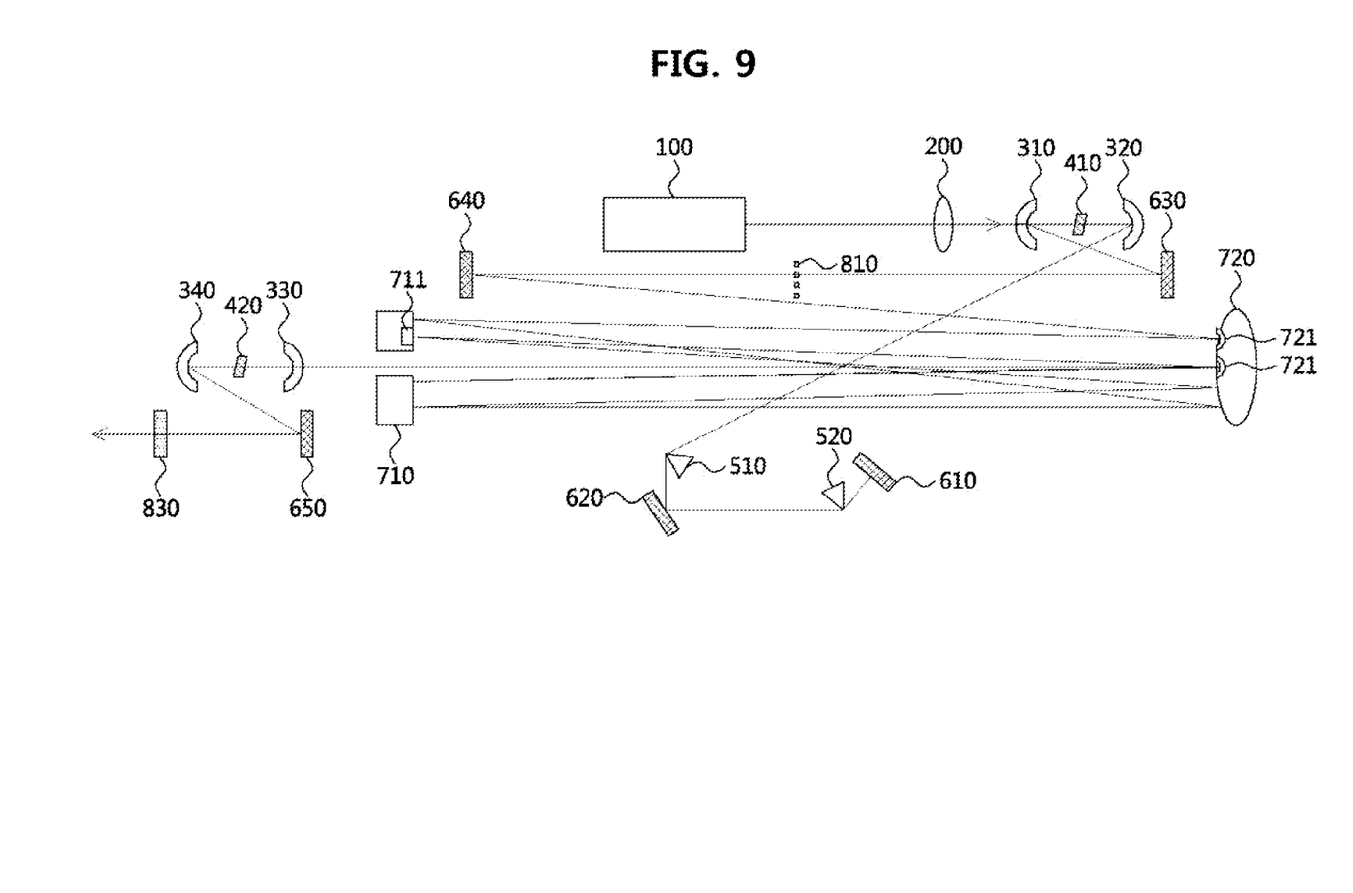
FIG. 9 and FIG. 10 are exemplary views explaining a pulsed laser device according to still another example embodiment of the present invention.
Figure 10:
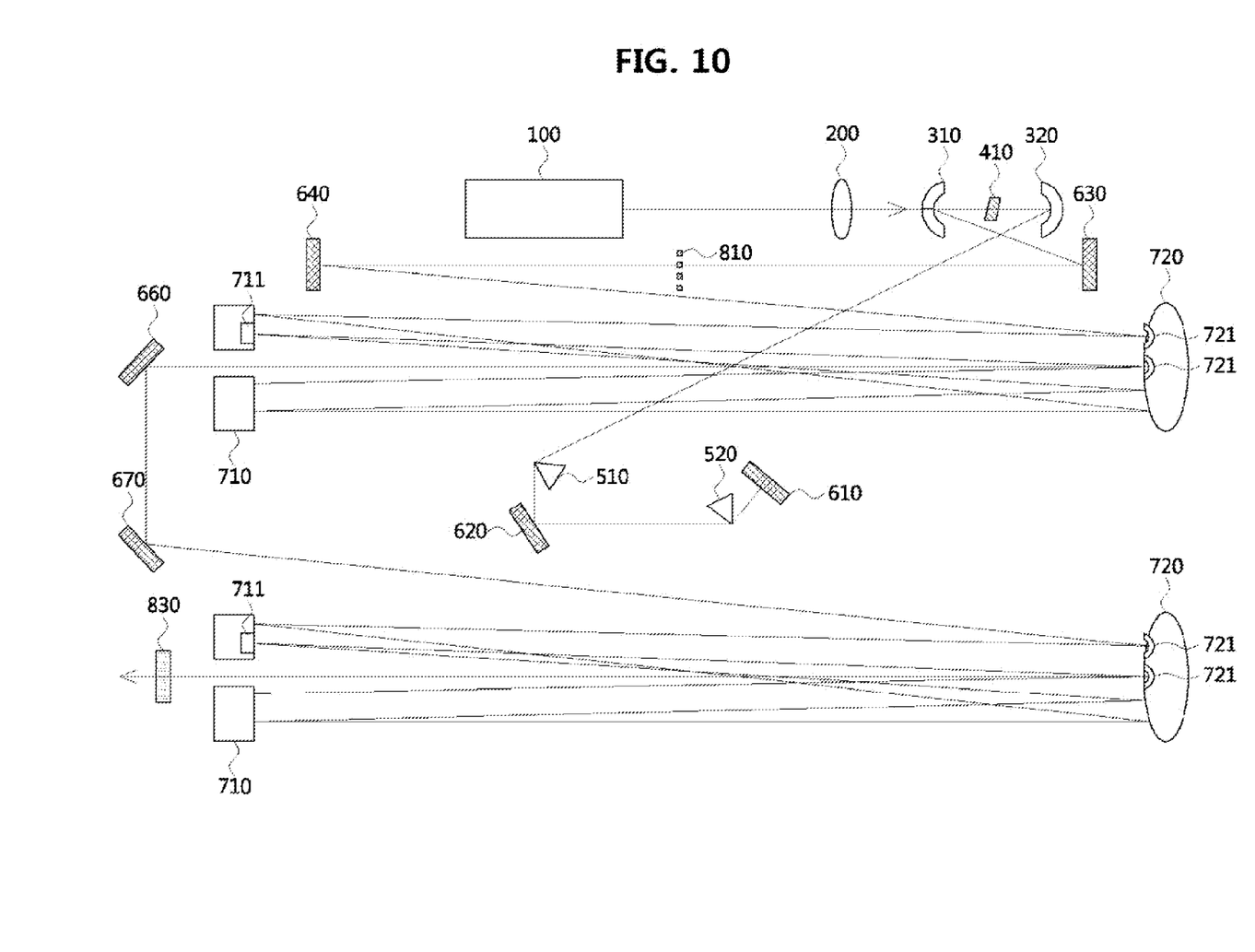

FIG. 9 and FIG. 10 are exemplary views explaining a pulsed laser device according to still another example embodiment of the present invention.

Referring to FIG. 9, a pulsed laser device according to FIG. 2 may be modified to a pulsed laser device according to FIG. 9. Referring to FIG. 9, a second resonator may further comprise a second gain medium 420 which a laser beam passing through the second output mirror 820 passes through, a third curved surface mirror 330 reflecting or retroreflecting sequentially the laser beam which passed through the second gain medium 420, a fourth curved surface mirror 340, and a fifth reflection mirror 650. Therefore, the laser beam which passed through the above-described components may be outputted through a final output mirror 830.

That is, by making a high power pulse pass through the second gain medium 420 such as a non-linear material or a filter, unstability of the high power pulse due to self-phase modulation and self-amplitude modulation in the resonator may be removed.

Referring to FIG. 10, a pulsed laser device may also be configured by connecting the two resonators depicted in FIG. 2. That is, according to an example embodiment of the present invention, a pulsed laser device may further include the additional second resonator having the same components with the second resonator depicted in FIG. 2. The laser beam which passed through the second output mirror 820 is delivered to the additional second resonator, and the additional second resonator may make the laser beam resonate by reflecting repetitively. Thus, the laser beam passing the additional second resonator may be outputted from the final output mirror 830. Of course, more than two second resonators may be equipped in the pulsed laser device additionally.

As described above, a pulsed laser device according to an example embodiment of the present invention may increase pulse energy without using a multi-stage amplifier so that a high power laser beam, especially, a femtosecond laser beam can be generated.

Also, the present invention may maintain a laser beam path in a resonator being simplified and make an optical alignment easy so that a high power pulse can be generated with occupying a smaller space.

In addition, the present invention may maintain mode locking conditions of the conventional resonator efficiently.

While the example embodiments of the present invention and their advantages have been described in detail, it should be understood that various changes, substitutions and alterations may be made herein without departing from the scope of the invention.

What is claimed is:

1. A high-power ultra-short pulsed laser device comprising:
   a first resonator making a pump beam resonate primarily and passing the pump beam which resonated through a first output mirror; and
   a second resonator comprising a first multiple reflection mirror and a second multiple reflection mirror,
   wherein the first multiple reflection mirror includes at least one first small area mirror positioned in the first multiple reflection mirror, and the second multiple reflection mirror includes at least one second small area mirror positioned in the second multiple reflection mirror, and the second resonator makes a laser beam delivered from the first resonator resonate by reflecting the laser beam repetitively.

2. The laser device of claim 1,
   wherein at least one first gap is formed in the first multiple reflection mirror, and at least one second gap is formed in the second multiple reflection mirror, and
   wherein the at least one first small area mirror is positioned in the at least one first gap, and the at least one second small area mirror is positioned in the at least one second gap.

3. The laser device of claim 1, wherein the first resonator comprises a focusing lens focusing the pump beam, a first gain medium through which the pump beam focused by the focusing lens passes, a first curved surface mirror, a first reflection mirror, a second reflection mirror, a second curved surface mirror, and a third reflection mirror which make the laser beam which passed through the first gain medium be reflected or retroreflected sequentially.

4. The laser device of claim 1, further comprising a pump laser generating the pump beam.

5. The laser device of claim 1, wherein the laser beam which is made resonate primarily by the first resonator is reflected on a fourth reflection mirror, and delivered to one of the at least one second small mirror, and reflected repetitively between the first multiple reflection mirror and the second multiple reflection mirror.

6. The laser device of claim 1, wherein the first multiple reflection mirror and the at least one first small area mirror are plane reflection mirrors, and the second multiple reflection mirror and the at least one second small area mirror are curved surface reflection mirrors.

7. The laser device of claim 2, wherein the laser beam which is reflected finally on the second multiple reflection mirror passes through one of the at least one first gap and is delivered to the second output mirror.

8. The laser device of claim 7, further comprising a second gain medium through which the laser beam which passed through the second output mirror passes, a third curved surface mirror, a fourth curved surface mirror, and a fifth curved surface mirror which reflect or retroreflect the laser beam which passed through the second gain medium sequentially.

9. The laser device of claim 7, further comprising additional resonator which makes the laser beam which passed through the second output mirror resonate by reflecting the laser beam repetitively,
   wherein the additional resonator has a same configuration with the second resonator.

10. The laser device of claim 2, wherein the at least one first through-hole and the at least one second through-hole have shapes of U or V.

\* \* \* \* \*